US010352756B2

(12) United States Patent
Suzuki et al.

(10) Patent No.: US 10,352,756 B2
(45) Date of Patent: Jul. 16, 2019

(54) MASS MEASUREMENT DEVICE

(71) Applicant: ISHIDA CO., LTD., Kyoto-shi, Kyoto (JP)

(72) Inventors: Akihito Suzuki, Ritto (JP); Makoto Nakatani, Ritto (JP); Shizuo Minamino, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 15/511,008

(22) PCT Filed: Sep. 17, 2015

(86) PCT No.: PCT/JP2015/076378
§ 371 (c)(1),
(2) Date: Mar. 13, 2017

(87) PCT Pub. No.: WO2016/043250
PCT Pub. Date: Mar. 24, 2016

(65) Prior Publication Data
US 2017/0284855 A1    Oct. 5, 2017

(30) Foreign Application Priority Data

Sep. 19, 2014   (JP) .................................. 2014-191638

(51) Int. Cl.
*G01G 3/142*   (2006.01)
*G01G 19/18*   (2006.01)
(Continued)

(52) U.S. Cl.
CPC .............. *G01G 3/142* (2013.01); *B25J 9/003* (2013.01); *B25J 15/0616* (2013.01);
(Continued)

(58) Field of Classification Search
CPC ................................ G01G 3/142; G01L 1/225
See application file for complete search history.

(56) References Cited

U.S. PATENT DOCUMENTS

2016/0347487 A1*   12/2016   Minamino ............. B25J 9/0093

FOREIGN PATENT DOCUMENTS

JP    H08094424 A    4/1996
JP    H09262786 A    10/1997
(Continued)

OTHER PUBLICATIONS

Search Report from the corresponding International Patent Application No. PCT/JP2015/076378 dated Dec. 15, 2015.
(Continued)

*Primary Examiner* — Jamel E Williams
(74) *Attorney, Agent, or Firm* — Shinjyu Global IP

(57) ABSTRACT

A mass measurement device comprises a force sensor, a hose, a base part, an article-holding part, and a computation unit. The force sensor has a fixed end and a free end, and outputs a sensing signal in accordance with the magnitude of a force in a sensitivity direction. The hose is configured to pass suctioned air through it. The fixed end is fixed to the base part. The article-holding part is fixed to the free end, one end of the hose is connected to the article-holding part, and the article-holding part holds an article by air suction. The computation unit computes the mass of the article based on the sensing signal.

14 Claims, 16 Drawing Sheets

(51) Int. Cl.
*B25J 9/00* (2006.01)
*B25J 15/06* (2006.01)
*B65B 61/28* (2006.01)
*B65G 47/90* (2006.01)
*B65G 47/91* (2006.01)
*G01L 1/22* (2006.01)
*G01G 23/00* (2006.01)
*G01G 23/01* (2006.01)

(52) U.S. Cl.
CPC ............ *B65B 61/28* (2013.01); *B65G 47/902* (2013.01); *B65G 47/91* (2013.01); *G01G 19/18* (2013.01); *G01G 23/00* (2013.01); *G01L 1/225* (2013.01); *G01L 1/2287* (2013.01); *G01G 23/01* (2013.01)

(56) References Cited

FOREIGN PATENT DOCUMENTS

| | | |
|---|---|---|
| JP | 2011038852 A | 2/2011 |
| JP | 5129371 B1 | 1/2013 |
| JP | 2013079931 A | 5/2013 |
| JP | 2013181948 A | 9/2013 |
| WO | WO2013042667 A1 | 3/2013 |

OTHER PUBLICATIONS

Preliminary Report on Patentability from the corresponding International Patent Application No. PCT/JP2015/076378 dated Mar. 21, 2017.

\* cited by examiner

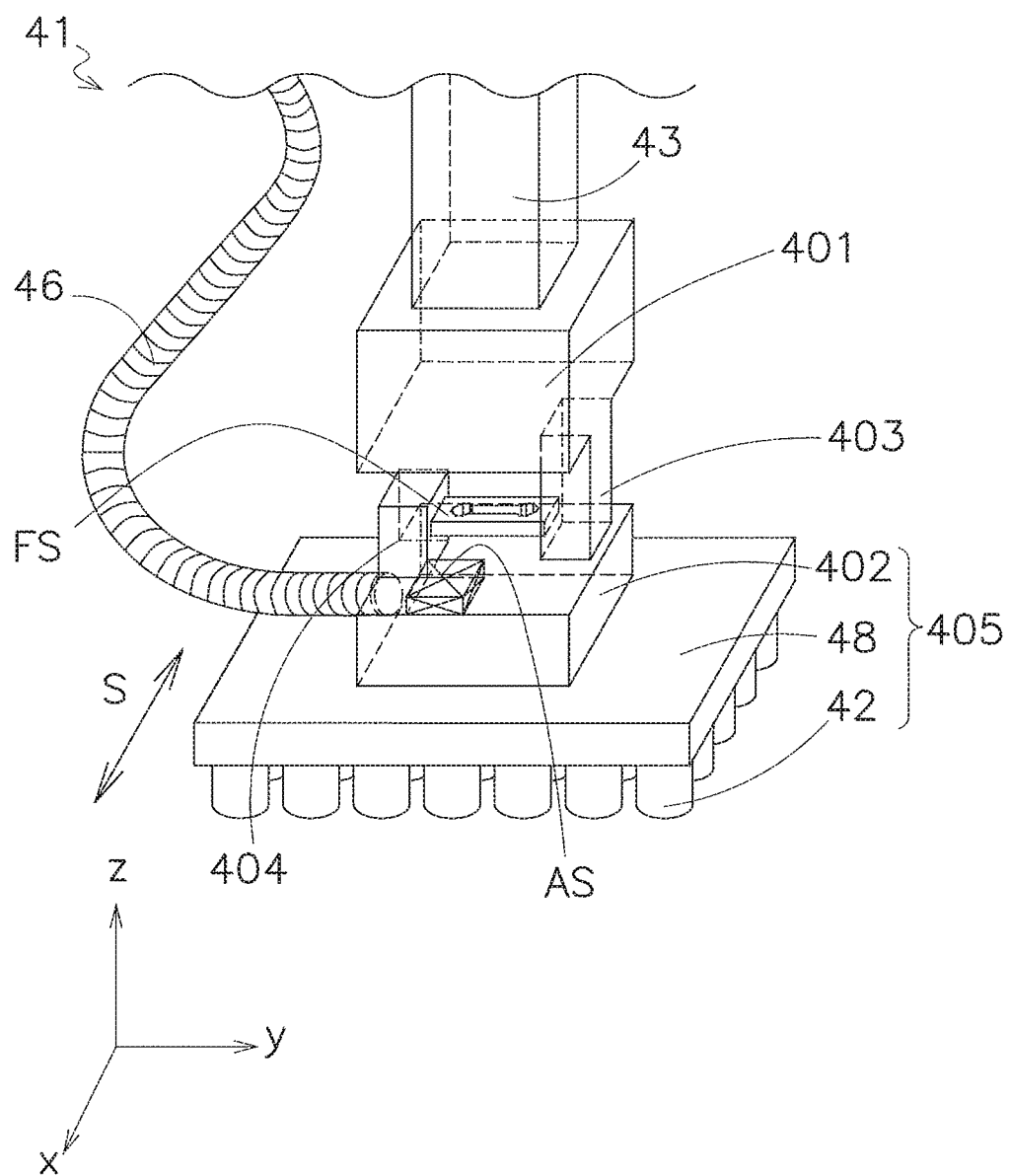
F I G. 6

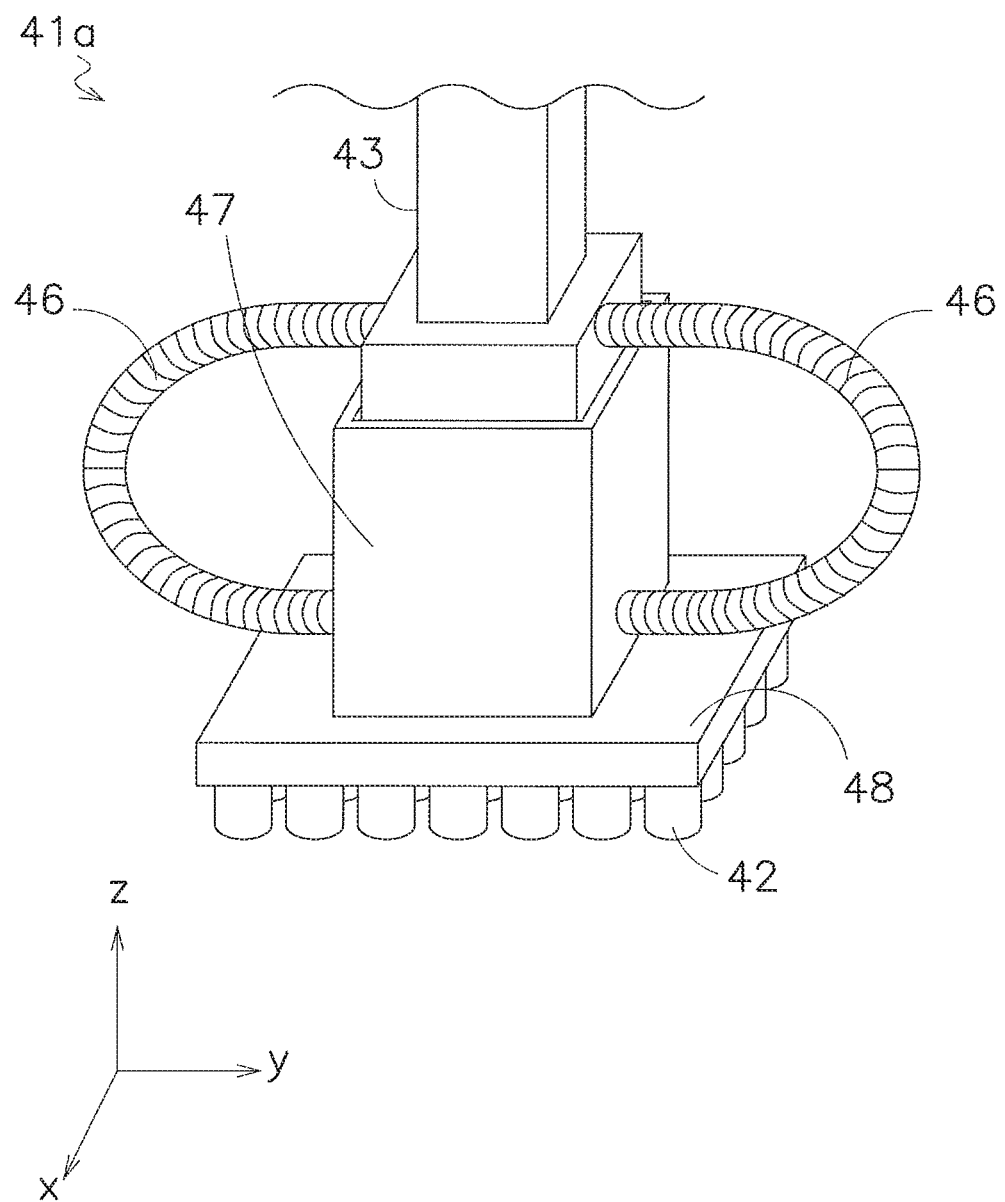
F I G. 1 0

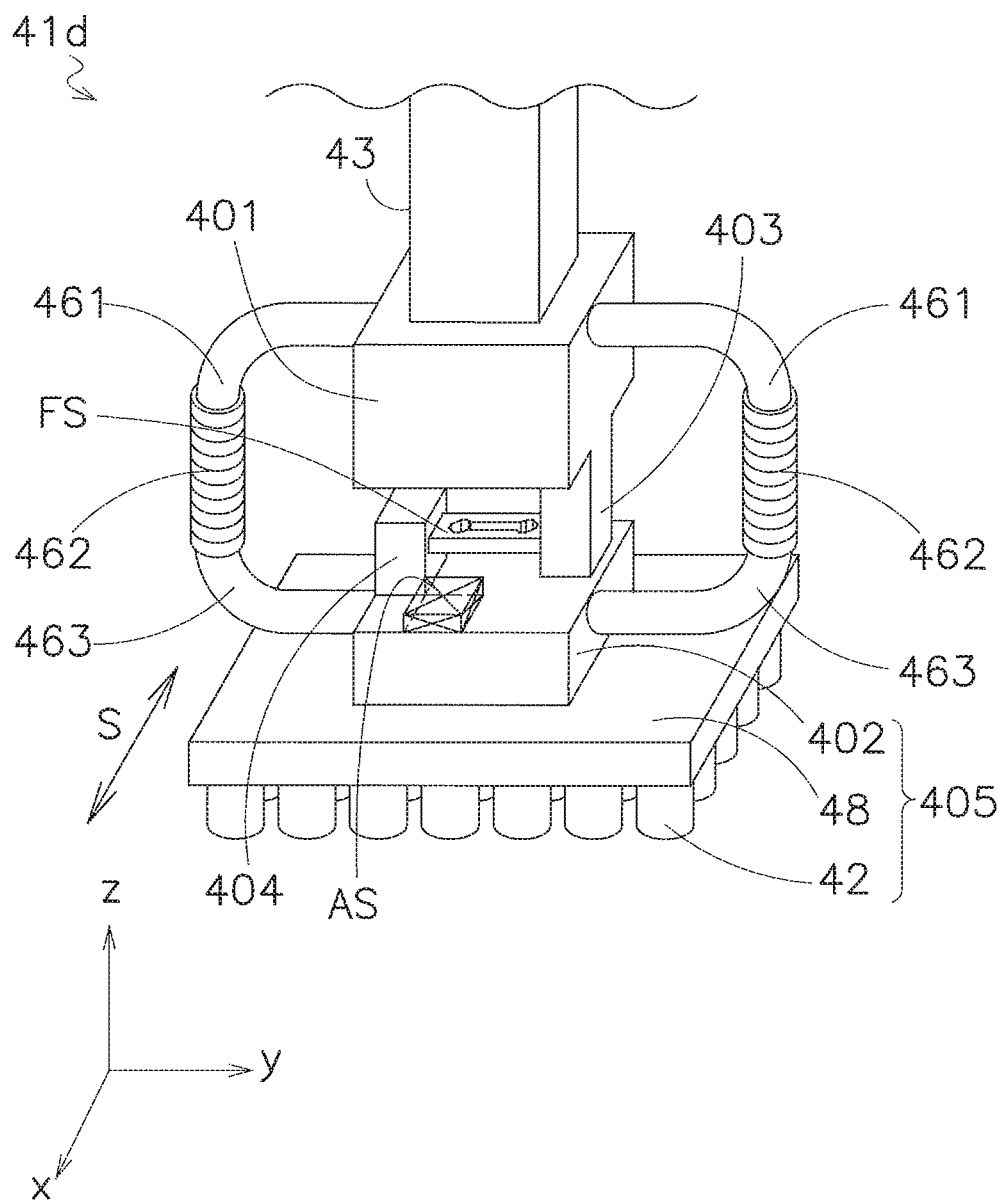
F I G. 15

MASS MEASUREMENT DEVICE

PRIORITY

This is a National Stage Application under 35 U.S.C. § 365 of International Application PCT/JP2015/076378, with an international filing date of Sep. 17, 2015, which claims priority to Japanese Patent Application No. 2014-191638 filed on Sep. 19, 2014. The entire disclosures of International Application PCT/JP2015/076378 and Japanese Patent Application No. 2014-191638 are hereby incorporated herein by reference.

TECHNICAL FIELD

Certain implementations of the present invention relate to a mass measurement device.

BACKGROUND ART

Various devices have been envisioned which measure the mass of an article by using an article-holding part that vacuum-retains the article by suctioning air. A mass measurement device may use an article-holding part referred to as a "robot hand" that suctions air. The weight of the article held by the robot hand is computed from an output signal of a sensor installed in proximity to the robot hand.

SUMMARY

To suction air, for example, a vacuum pump and a suction channel via which the vacuum pump and an article-holding part communicate are presumably needed. However, when the suction channel is constituted of a flexible hose, it is likely that the suction channel pulsates during the air-suctioning action, or move the instant that the air-suctioning action begins or ends. Such suction channel movement could have an adverse effect on the sensing action of a sensor that measures the mass of an article. When the suction channel is constituted of a rigid pipe, by contrast, the movement of a movable part provided to the mass measurement device to be used in the sensing action could be hindered.

An object of certain implementations of the present invention is to reduce measurement error caused by an air-suctioning action in a mass measurement device.

A mass measurement device according to a first aspect of the present invention comprises a force sensor, a suction channel, a base part, an article-holding part, and a computation unit. The force sensor has a fixed end and a free end, and outputs a sensing signal in accordance with a magnitude of a force in a sensitivity direction. The suction channel is configured to pass suctioned air through the suction channel. The fixed end is fixed to the base part. The article-holding part is fixed to the free end, one end of the suction channel is connected to the article-holding part, and the article-holding part holds an article due to the suctioned air. The computation unit is configured to compute a mass of the article based on the sensing signal. The force sensor and the suction channel are disposed so that an x-axis directional component of a force exerted on the article-holding part by the suction channel is the smallest among the x-axis directional component, a y-axis directional component, and a z-axis directional component. The sensitivity direction is an x-axis direction, a direction orthogonal to the x-axis direction is a y-axis direction, and a direction orthogonal to both the x-axis direction and the y-axis direction is a z-axis direction.

According to the aspect described above, because the x-axis directional component of the force exerted on the article-holding part by the suction channel is smaller than both the y-axis directional component and the z-axis directional component thereof, the component in the sensitivity direction of the force is reduced. As a result, measurement error caused by the air-suctioning action is reduced.

A mass measurement device according to a second aspect of the present invention is the mass measurement device according to the first aspect, wherein the suction channel is disposed so as to pass through the base part.

According to the aspect described above, the suction channel is supported at two points: at the article-holding part and at the base part. As a result, movement of the suction channel during air suction is further restrained.

A mass measurement device according to a third aspect of the present invention is the mass measurement device according to the first or second aspect, wherein the suction channel has a hose disposed in a yz plane which expands in the y-axis direction and the z-axis direction.

According to the aspect described above, the hose of the suction channel does not extend in the x-axis direction. As a result, movement of the suction channel in the x-axis direction during air suction is further restrained.

A mass measurement device according to a fourth aspect of the present invention is the mass measurement device according to any of the first through third aspects, wherein the suction channel has a rigid pipe disposed in a yz plane which expands in the y-axis direction and the z-axis direction.

According to the aspect described above, the suction channel has rigidity and does not extend in the x-axis direction. As a result, movement of the suction channel in the x-axis direction during air suction is further restrained.

A mass measurement device according to a fifth aspect of the present invention is the mass measurement device according to any of the first through third aspects, wherein the suction channel has a pair of rigid pipes separated by a gap.

According to the aspect described above, the pair of rigid pipes can move relative to each other due to the presence of the gap. As a result, movement of the movable part used in the sensing action is unlikely to be hindered.

A mass measurement device according to a sixth aspect of the present invention is the mass measurement device according to any of the first through third aspects, wherein the suction channel has a pair of rigid pipes having different diameter sizes, one pipe being inserted into the other pipe.

According to the aspect described above, because there is a difference in the diameter sizes, the pair of rigid pipes can move by a predetermined distance relative to each other. As a result, the movement of the movable part used in the sensing action is unlikely to be hindered.

A mass measurement device according to a seventh aspect of the present invention is the mass measurement device according to any of the first through sixth aspects, wherein the force exerted on the article-holding part by the suction channel is generated by pulsation of the suction channel during air suction, or by movement of the suction channel caused by start or end of air suction.

According to the aspect described above, it is possible to restrain measurement error from being induced by pulsation of the suction channel during air suction or by movement of the suction channel caused by the start or end of air suction.

A mass measurement device according to an eighth aspect of the present invention is the mass measurement device according to any of the first through seventh aspects, further comprising a robot that causes the base part to move.

According to the aspect described above, the article, which is the object of the mass measurement, can be moved.

A mass measurement device according to a ninth aspect of the present invention is the mass measurement device according to any of the first through eighth aspects, further comprising an acceleration sensor that outputs an acceleration signal in accordance with a magnitude of an acceleration of the article-holding part in the sensitivity direction. The computation unit is configured to compute the mass of the article based on the sensing signal outputted by the force sensor when the base part moves in the sensitivity direction, and the acceleration signal outputted by the acceleration sensor when the base part moves in the sensitivity direction.

According to the aspect described above, the acceleration signal can be used for the mass computation in addition to the sensing signal of the force sensor. As a result, the mass of the article can be measured while the article is moving.

A mass measurement device according to a tenth aspect of the present invention is the mass measurement device according to any of the first through ninth aspects, wherein the sensitivity direction is a horizontal direction.

With this configuration, measurements can be taken by detecting a force in a horizontal direction. As a result, it is possible to measure the mass of an article moving horizontally, for example.

A mass measurement device according to an eleventh aspect of the present invention is the mass measurement device according to any of the first through ninth aspects, wherein the sensitivity direction is a vertical direction.

According to the aspect described above, measurements can be taken by detecting a force in a vertical direction. As a result, the mass of an article moving vertically can be measured. Another possibility is that the mass of an article remaining stationary can be measured by detecting the gravitational force acting on the article.

A mass measurement device according to a twelfth aspect of the present invention is the mass measurement device according to any of the first through eleventh aspects, wherein the force sensor is a strain gauge-type load cell.

According to the aspect described above, it is possible to configure a mass measurement device that has high accuracy and is not readily affected by temperature changes.

A mass measurement device according to a thirteenth aspect of the present invention is the mass measurement device according to any of the first through twelfth aspects, further comprising a vacuum pump in communication with the suction channel.

According to the aspect described above, a suction force for an article can be produced by the vacuum pump.

Provided that the mass measurement device according to the present invention is used, measurement error caused by the air-suctioning action is reduced.

BRIEF DESCRIPTION OF THE DRAWINGS

FIG. 6 is a perspective view showing the mass measurement device according to the first embodiment of the present invention;

FIG. 10 is a perspective view showing the mass measurement device according to the second embodiment of the present invention;

FIG. 15 is a perspective view showing a mass measurement device according to a third embodiment of the present invention;

DETAILED DESCRIPTION

Figure 1:
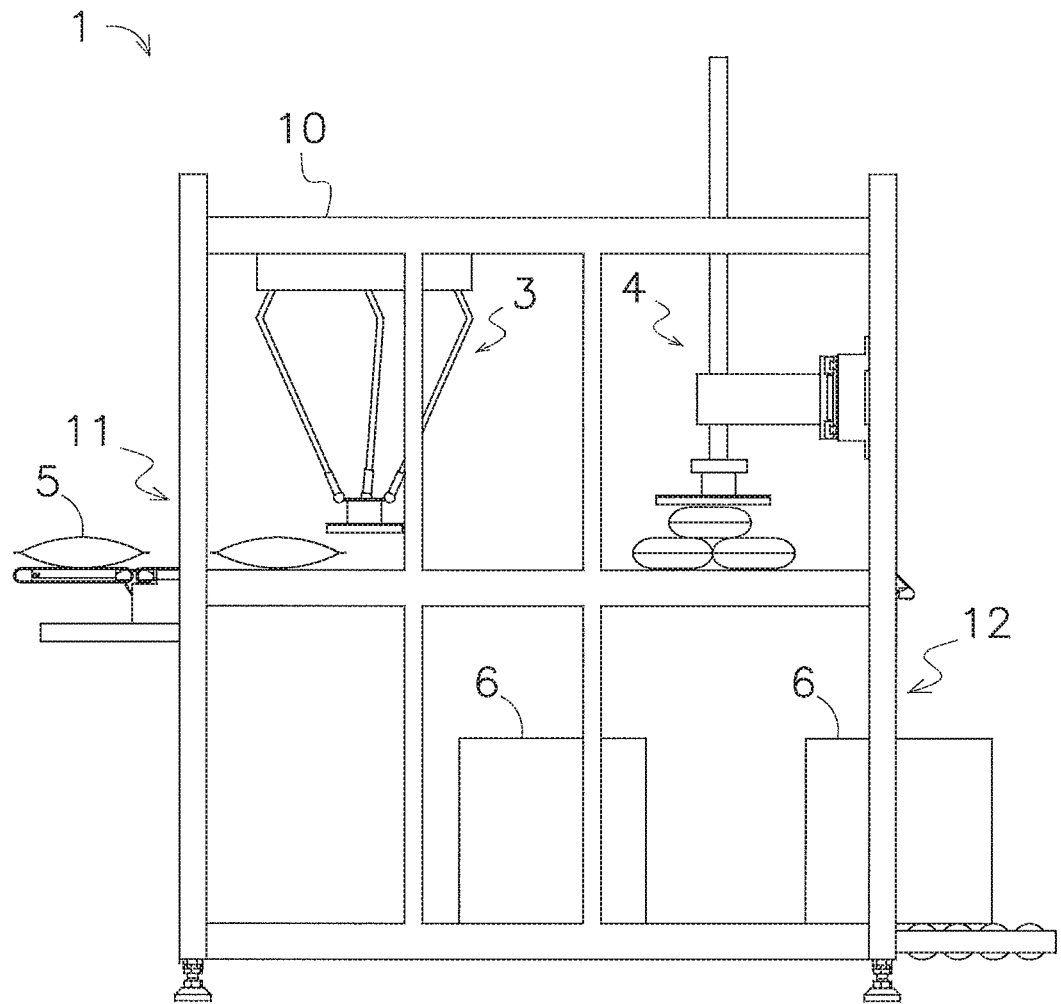
FIG. 1 is a side view of a boxing apparatus equipped with a mass measurement device according to the first embodiment of the present invention.

First Embodiment (1) Boxing Apparatus
(1-1) Configuration and Action of Boxing Apparatus FIG. 1 shows an external view of a boxing apparatus 1 equipped with a mass measurement device according to a first embodiment of the present invention. This boxing apparatus 1 is used for filling a packing box 6 with multiple articles 5.

A frame 10 of the boxing apparatus 1 is provided with an entry area 11 for receiving articles 5, and an exit area 12 for ejecting a packing box 6 that has finished being filled with multiple articles 5. Furthermore, a parallel link robot 3 and a boxing robot 4 are installed to the frame 10.

Figure 2:
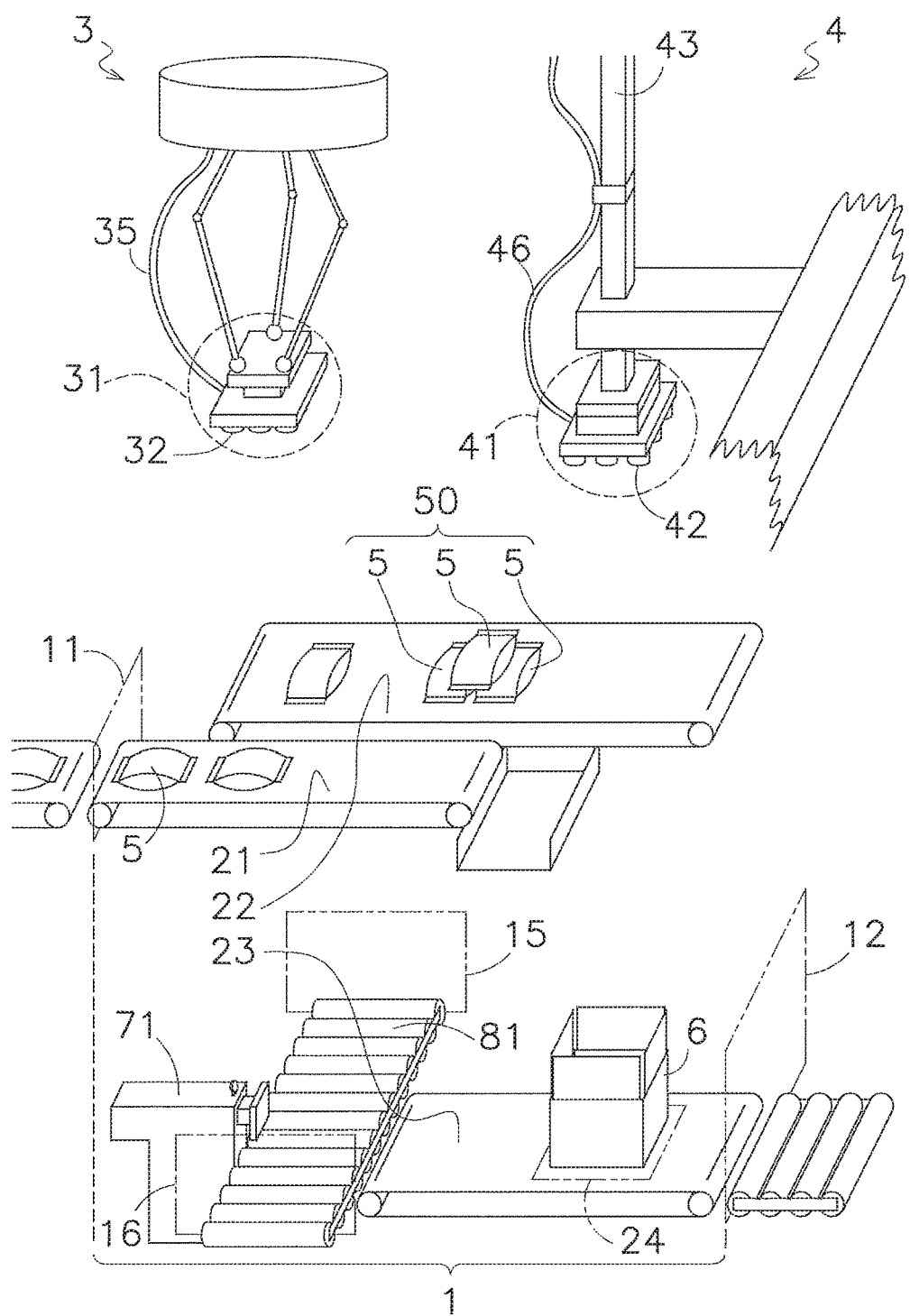
FIG. 2 shows the internal configuration of the boxing apparatus shown in FIG. 1.

FIG. 2 shows the internal configuration of the boxing apparatus 1.

Articles 5 are inserted through the entry area 11. The articles 5 are conveyed a predetermined distance by a first conveyor 21, and are then raised up by the parallel link robot 3. Tubular vacuum-retaining tools 32 are provided to a head 31 of the parallel link robot 3, and the head 31 can hold an article 5 due to air being suctioned through the vacuum-retaining tools 32. The parallel link robot 3 moves and rotates an article 5 and places the article on a second conveyor 22, creating an article group 50 composed of a predetermined number of articles 5. The article group 50 is conveyed by the second conveyor 22 into proximity of the boxing robot 4, and stands by in that location.

An empty packing box 6 is loaded into the boxing apparatus 1 from either a first packing box entry area 15 or a second packing box entry area 16. The packing box 6 then moves over conveyor rollers 81 to be pushed toward a third conveyor 23 by a box-moving mechanism 71. The third conveyor 23 is disposed beneath the first conveyor 21. The end part of the third conveyor 23 that is downstream in the conveying direction extends further downstream than the end part of the first conveyor that is downstream in the conveying direction. The packing box 6 is conveyed by the third conveyor 23 to a packing box waiting section 24 positioned beneath the boxing robot 4, and stand by in that location.

Tubular vacuum-retaining tools 42 are provided to a head 41 of the boxing robot 4 as well, and the head 41 can hold an article group 50 at a time due to air being suctioned in through the vacuum-retaining tools 42. First, the boxing robot 4 raises an article group 50 up from the second conveyor 22, moves the article group horizontally, and carries the article group to above an empty packing box 6 that is standing by in the standing-by packing box section 24. Next, the boxing robot 4 lowers the article group 50 to put it in the packing box 6. The boxing robot 4 repeats this operation to stack a predetermined number of article groups 50 inside the packing box 6.

Finally, the packing box 6, which has finished being filled with a predetermined number of articles 5, is conveyed by the third conveyor 23 and ejected from the exit area 12.

Figure 3:
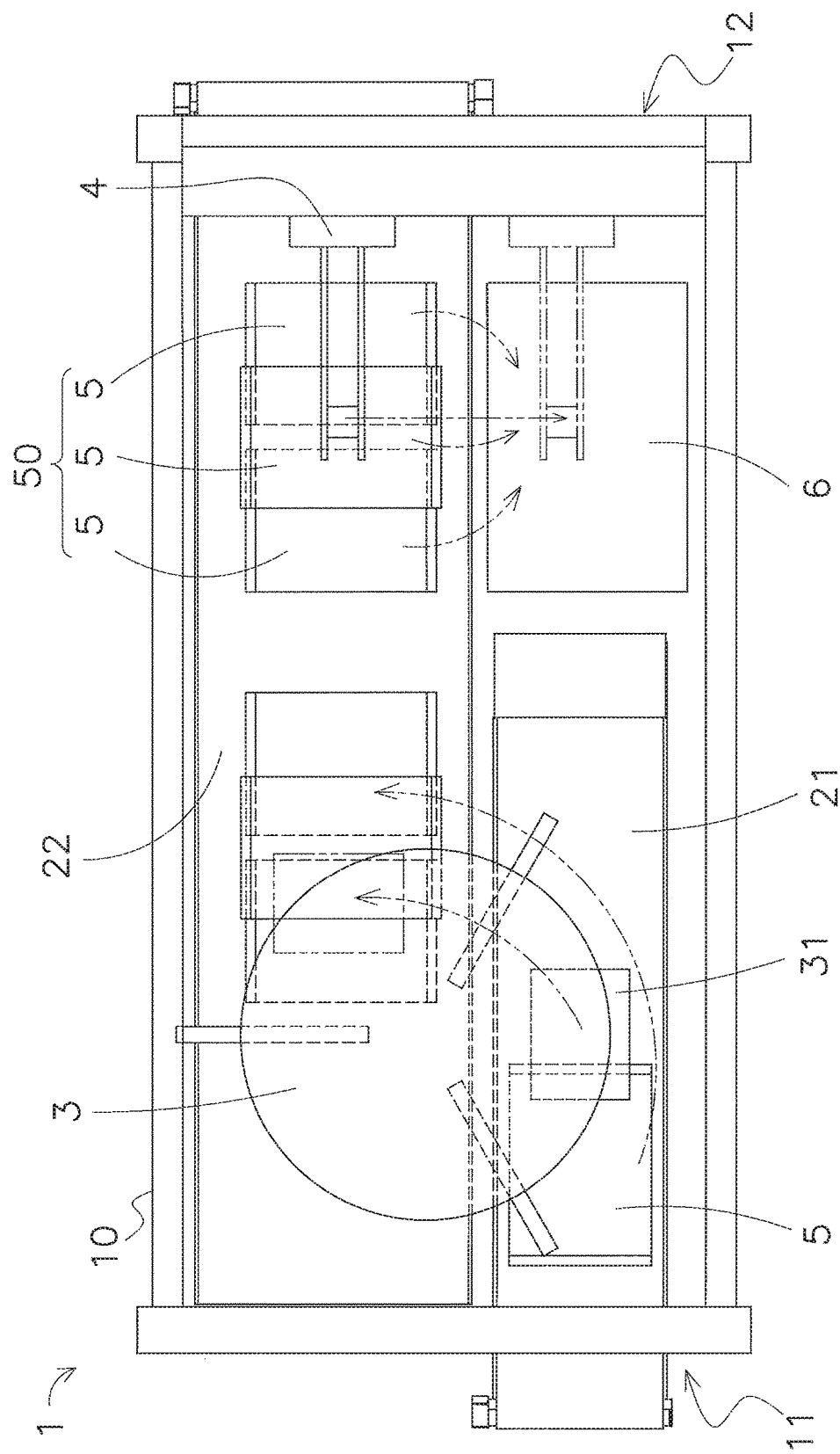
FIG. 3 is a plan view of the boxing apparatus shown in FIG. 1.

FIG. 3 is a plan view of the boxing apparatus 1. This view shows how articles 5 and/or article groups 50 are conveyed by the parallel link robot 3 and/or the boxing robot 4.

(1-2) Air Suction Mechanism

As shown in FIG. 2, the vacuum-retaining tools 32 of the parallel link robot 3 communicate with a hose 35 connected to the head 31, and the vacuum-retaining tools 42 of the boxing robot 4 communicate with a hose 46 connected to the head 41.

Figure 4:
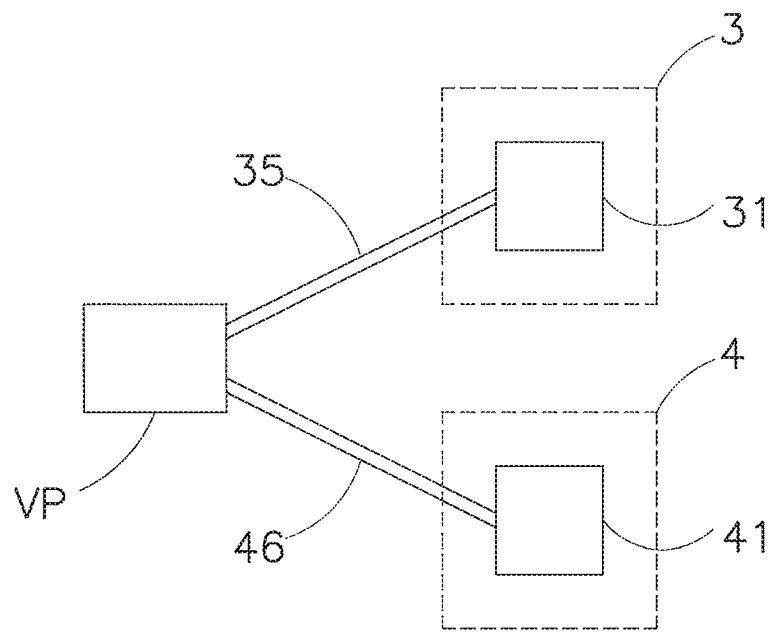
FIG. 4 shows an air suction mechanism used in the boxing apparatus shown in FIG. 1.

As shown in FIG. 4, the hose 35 and the hose 46 communicate with a vacuum pump VP. The vacuum pump VP generates suction force for holding the articles 5 and/or the article groups 50.

(2) Configuration of Mass Measurement Device

The mass measurement device according to the first embodiment of the present invention is constituted of the head 41 of the boxing robot 4, the hose 46, the vacuum pump VP, a detection unit DT (FIG. 8) and computation unit COM (FIG. 8) described hereinafter, and other components.

(3) Configuration of Head 41

(3-1) Overall Configuration

Figure 5:
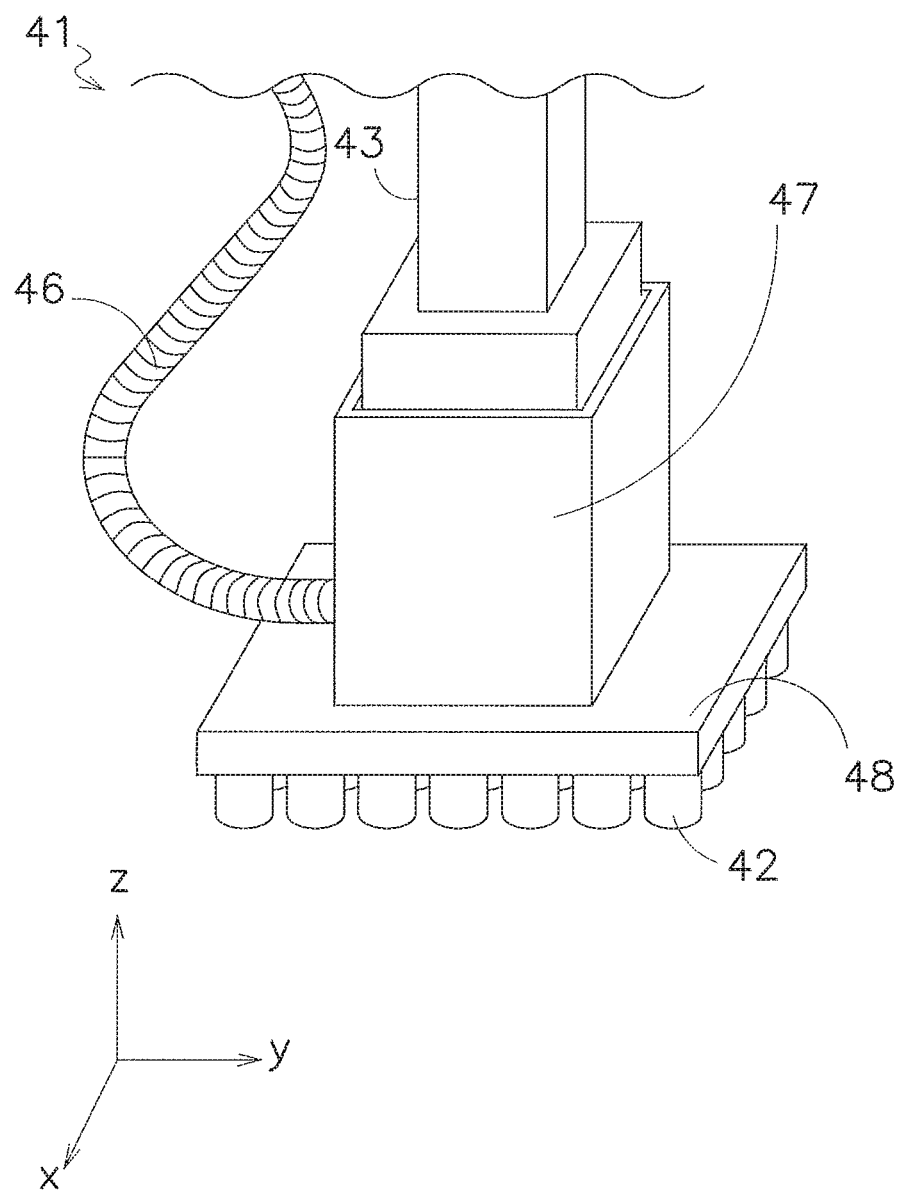
FIG. 5 is a perspective view showing the mass measurement device according to the first embodiment of the present invention.

FIG. 5 shows an external view of the head 41. The head 41 is attached to a mast 43 of the boxing robot 4. The head 41 has a cover 47 that covers an internal mechanism. The internal dimensions of the cover 47 are greater than the external dimensions of a base part 401 and movable part 402 described hereinafter, so as not to hinder changes in the relative positioning of the base part and movable part. The cover 47 may not be provided.

FIG. 6 shows the head 41 with the cover 47 removed. The head 41 has the base part 401, an article-holding part 405, a force sensor FS, and an acceleration sensor AS.

(3-2) Base Part 401

The base part 401 is composed of a rigid member made of, e.g., a metal or the like, and is fixed to the distal end of the mast 43 of the boxing robot 4, as shown in FIG. 6. The base part 401 has a base-extending part 403.

(3-3) Article-Holding Part 405

The article-holding part 405 includes the vacuum-retaining tools 42, a vacuum-retaining tool support part 48, and the movable part 402.

The vacuum-retaining tools 42 are elastic, tubular members. Internal spaces in the vacuum-retaining tools 42 are used as air flow channels. The vacuum-retaining tools 42 deform and adhere firmly to the articles 5 when pressed thereon.

The vacuum-retaining tool support part 48 is a hollow member to which a plurality of vacuum-retaining tools 42 are fixed. An internal space in the vacuum-retaining tool support part 48 communicates with the internal space of each of the vacuum-retaining tools 42.

The movable part 402 is composed of a rigid member made of, e.g., a metal or the like, and is fixed to the vacuum-retaining tool support part 48 and the hose 46. The movable part 402 has an unillustrated air passage via which the internal space in the vacuum-retaining tool support part 48 and the hose 46 communicate. Furthermore, the movable part 402 has a movable extending part 404.

(3-4) Force Sensor FS

Figure 7:
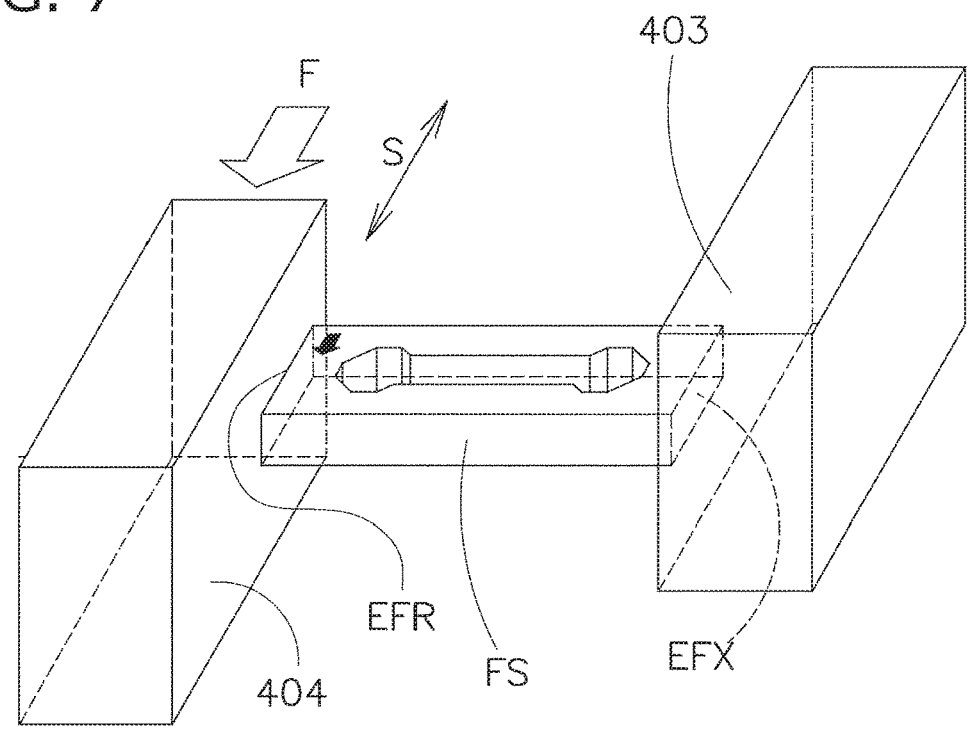
FIG. 7 is an enlarged view showing a force sensor installed in the mass measurement device according to the first embodiment of the present invention.

FIG. 7 is an enlarged view of the force sensor FS and the surrounding structure. The force sensor FS is an element that can measure force exerted in a sensitivity direction S. In the present embodiment, the force sensor FS is constituted of a strain gauge-type load cell. Therefore, a physical characteristics such as a resistance value of the force sensor FS changes in accordance with the extent of the strain on the force sensor FS in the sensitivity direction S. This physical characteristic is used as a sensing signal.

As shown in FIG. 7, the force sensor FS has a fixed end EFX and a free end EFR. The fixed end EFX is fixed to the base-extending part 403. The free end EFR is fixed to the movable extending part 404.

Among a mutually orthogonal x-axis direction, y-axis direction, and z-axis direction, which are shown in FIG. 7, it is the x-axis direction with which the sensitivity direction S of the force sensor FS coincides. In the present embodiment, the x-axis direction coinciding with the sensitivity direction S is a horizontal direction, and the z-axis direction is a vertical direction.

(3-5) Acceleration Sensor AS

Returning to FIG. 6, the acceleration sensor AS is installed on the movable part 402, and outputs acceleration signals corresponding to the acceleration of the movable part 402 in the x-axis direction, i.e. in the sensitivity direction S of the force sensor FS. The acceleration sensor AS can be constituted of a strain gauge-type load cell provided with a weight at its free end, a MEMS-type small acceleration sensor, an ordinary commercial acceleration sensor, or the like.

(4) Action of Mass Measurement Device

When the head 41 shown in FIG. 6 moves in the x-axis direction while holding an article group 50, the movable extending part 404 moves in the x-axis direction relative to the base-extending part 403. Strain in the sensitivity direction S coinciding with the x-axis direction thereby occurs in the force sensor FS. The force sensor FS outputs a sensing signal corresponding to the extent of the strain.

The extent of the strain on the force sensor FS corresponds to force F (FIG. 7) thought to be applied to the movable extending part 404. This force F increases and decreases in accordance with the mass of the held article group 50 and the acceleration of the head 41 in the x-axis direction. Therefore, the sensing signal outputted by the force sensor FS depends on the extent of the force F.

Figure 8:
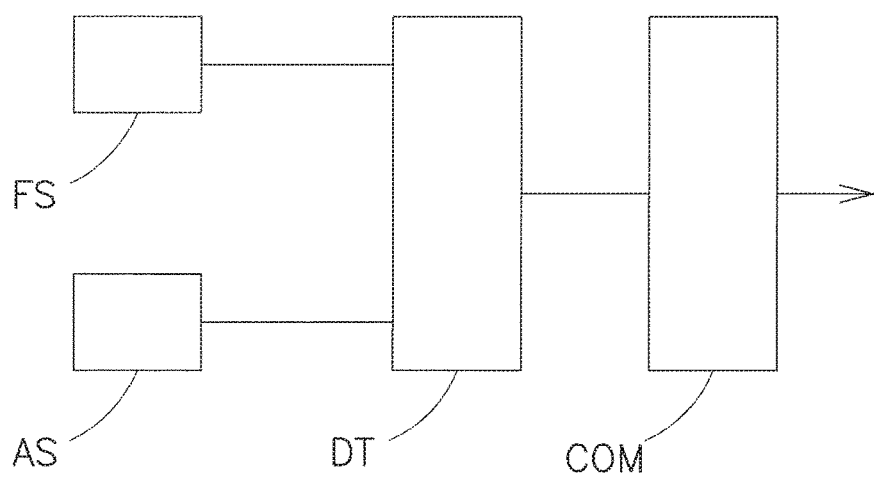
FIG. 8 is a block diagram of a signal processing circuit of the mass measurement device according to the first embodiment of the present invention.

FIG. 8 is a block diagram of a signal processing circuit of the mass measurement device according to the first embodiment of the present invention. The sensing signal outputted by the force sensor FS and the acceleration signal outputted by the acceleration sensor AS are detected by the detection unit DT and sent to the computation unit COM.

From the sensing signal or from the sensing signal and the acceleration signal, the computation unit COM computes the mass of the article group 50 held by the head 41 and outputs this mass.

(5) Characteristics

As shown in FIG. 6, the hose 46 travels in the yz plane, and is disposed so as to not change position in the x-axis direction by any appreciable degree. The yz plane is orthogonal to the sensitivity direction S of the force sensor FS.

While air-suctioning action is being performed by the operation of the vacuum pump VP, the flexible hose 46 might pulsate. At the instant when the air-suctioning action begins or ends due to the vacuum pump VP being controlled, the hose 46 might move. There could be cases in which movements of the hose 46 such as these result in the hose 46 exerting force on the article-holding part 405.

When this force is broken down into the x-axis direction, the y-axis direction, and the z-axis direction, because the hose is traveling through the yz plane, the x-axis directional component, which of these three components is equivalent to the force in the sensitivity direction S, is considered the smallest. Therefore, the effect that the movement of the hose 46 caused by the air-suctioning action has on the measurement of the force sensor FS and/or the acceleration sensor AS is restrained.

Second Embodiment (1) Boxing Apparatus

Figure 9:
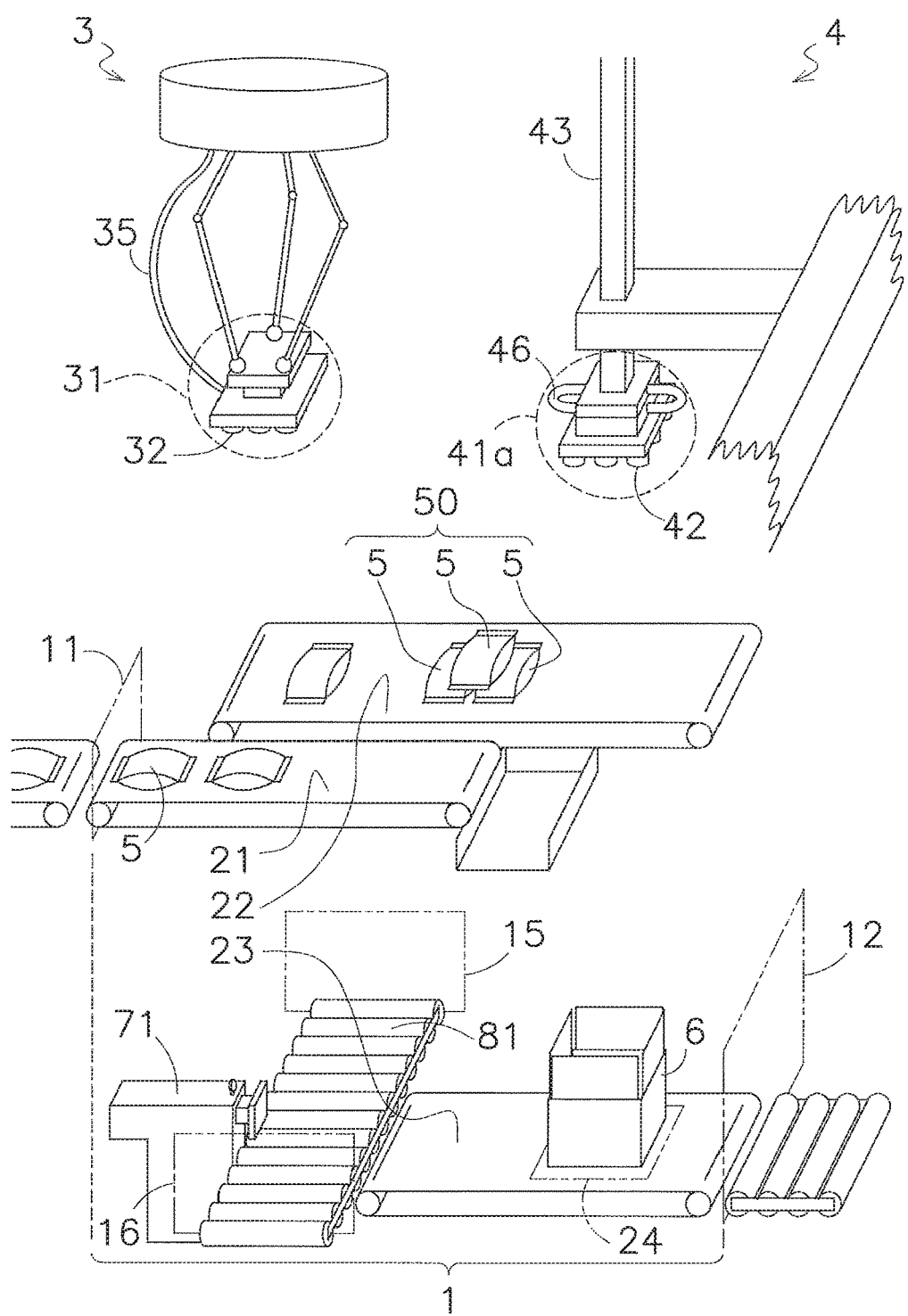
FIG. 9 shows the internal configuration of a boxing apparatus equipped with a mass measurement device according to a second embodiment of the present invention.

FIG. 9 shows the internal configuration of a boxing apparatus 1 equipped with a mass measurement device according to a second embodiment of the present invention. The second embodiment has the same elements as the first embodiment aside from the structure of the head 41a of the boxing robot 4 being different from the structure of the head 41 of the first embodiment. Specifically, in the second embodiment, air suctioned through the vacuum-retaining tools 42 of the head 41a of the boxing robot 4 first comes out of the head 41a to pass through the hose 46, then returns to the head 41a, and thereafter passes through the internal space in the mast 43 and heads toward the vacuum pump VP (FIG. 3).

(2) Configuration of Mass Measurement Device

The mass measurement device according to the second embodiment of the present invention is also constituted of a head 41a of the boxing robot 4, a hose 46, a vacuum pump VP, a detection unit DT, a computation unit COM, and other components.

(3) Configuration of Head 41a

(3-1) Overall Configuration

FIG. 10 shows an external view of the head 41a. The head 41a is attached to a mast 43 of the boxing robot 4. The head 41a has a cover 47 that covers an internal mechanism. The internal dimensions of the cover 47 are greater than the external dimensions of a base part 401 and movable part 402 described hereinafter, so as to not hinder changes in the relative positioning of the base part and movable part. The cover 47 may not be provided.

Figure 11:
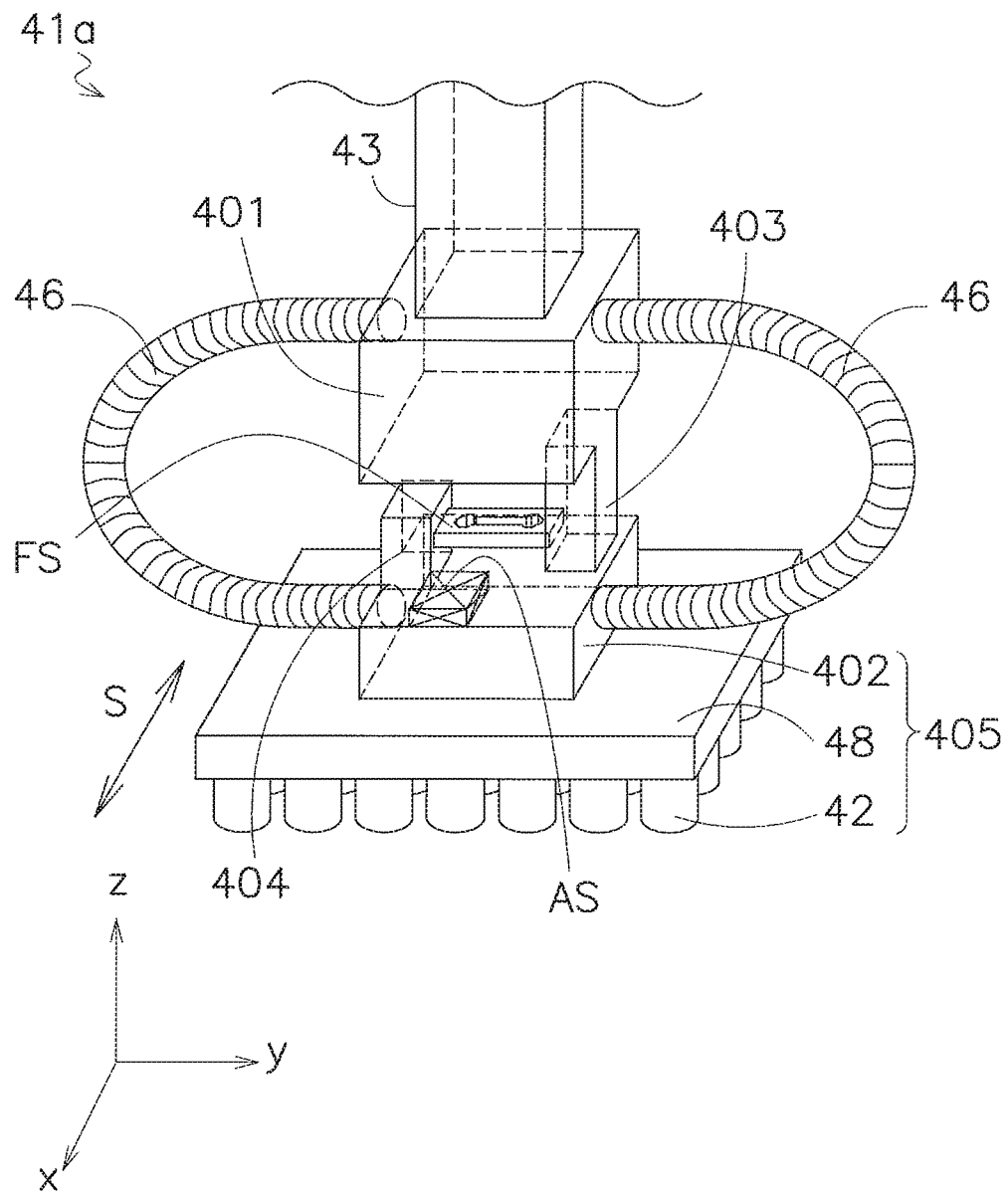
FIG. 11 is a perspective view showing the mass measurement device according to the second embodiment of the present invention.

FIG. 11 shows the head 41a with the cover 47 removed. The head 41a has the base part 401, an article-holding part 405, a force sensor FS, and an acceleration sensor AS. Two hoses 46 link the base part 401 and the movable part 402.

(3-2) Base Part 401

The base part 401 is composed of a rigid member made of, e.g., a metal or the like, and is fixed to the distal end of the mast 43 of the boxing robot 4, as shown in FIG. 11. Furthermore, the base part 401 has a base-extending part 403. The base part 401 of the head 41a has an unillustrated air passage via which the internal space in the mast 43 and one end of each of the hoses 46 communicate.

(3-3) Article-Holding Part 405

The article-holding part 405 includes vacuum-retaining tools 42, a vacuum-retaining tool support part 48, and the movable part 402.

The vacuum-retaining tools 42 are elastic, tubular members. Internal spaces in the vacuum-retaining tools 42 are used as air flow channels. The vacuum-retaining tools 42 deform and adhere firmly to the articles 5 when pressed against the articles 5.

The vacuum-retaining tool support part 48 is a hollow member to which multiple vacuum-retaining tools 42 are fixed. An internal space in the vacuum-retaining tool support part 48 communicates with each of the internal spaces of the vacuum-retaining tools 42.

The movable part 402 is composed of a rigid member made of, e.g., a metal or the like, and is fixed to the vacuum-retaining tool support part 48 and the hoses 46. The movable part 402 has an unillustrated air passage via which the internal space in the vacuum-retaining tool support part 48 and the hoses 46 communicate. Furthermore, the movable part 402 has a movable extending part 404.

(3-4) Force Sensor FS

The force sensor FS is installed according to the structure shown in FIG. 7, similarly with respect to the first embodiment. Specifically, a fixed end EFX and a free end EFR of the force sensor FS are fixed to the base-extending part 403 and to the movable extending part 404, respectively. The sensitivity direction S of the force sensor FS is the x-axis direction, which is the horizontal direction.

(3-5) Acceleration Sensor AS

Returning to FIG. 11, the acceleration sensor AS is installed on the movable part 402, similarly with respect to the first embodiment. The acceleration sensor AS outputs acceleration signals that correspond to the acceleration of the movable part 402 in the x-axis direction, i.e., in the sensitivity direction S of the force sensor FS.

(4) Action of Mass Measurement Device

The operating principle of the mass measurement device according to the second embodiment is the same as in the first embodiment.

(5) Characteristics

Similarly, with respect to the first embodiment, the hoses 46 are disposed so as to travel through the yz plane and not change by any appreciable degree in terms of x-axis directional position, as shown in FIG. 11. The yz plane is orthogonal to the sensitivity direction S of the force sensor FS.

Additionally, in the second embodiment, each hose 46 is supported at two points: on the base part 401 and on the movable part 402.

Therefore, the effect that the movement of the hoses 46 caused by the air-suctioning action has on the measurement of the force sensor FS and/or the acceleration sensor AS is further restrained.

(6) Modifications (6-1) First Modification 2A

Figure 12:
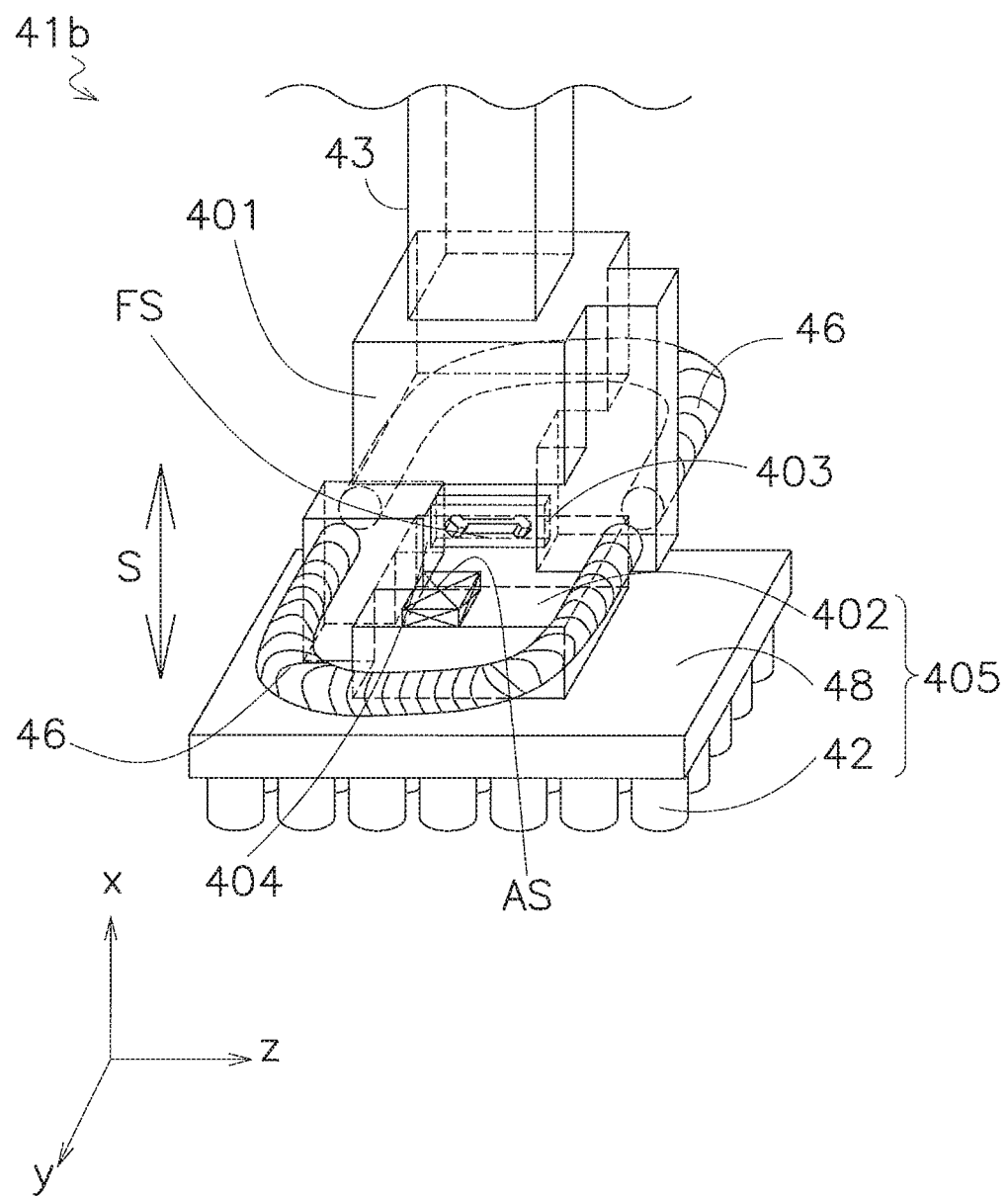
FIG. 12 is a perspective view showing a mass measurement device according to a first modification 2A of the second embodiment of the present invention.

FIG. 12 shows a head 41*b* of a mass measurement device according to a first modification 2A of the second embodiment of the present invention. In this drawing, the x-axis, y-axis, and z-axis directions differ from those in FIG. 11, and it should be noted that the x-axis direction is the vertical direction. With the mass measurement device according to the first modification 2A of the second embodiment, the sensitivity direction S of the force sensor FS, which coincides with the x-axis, is the vertical direction, unlike in the second embodiment (FIG. 11).

Figure 13:
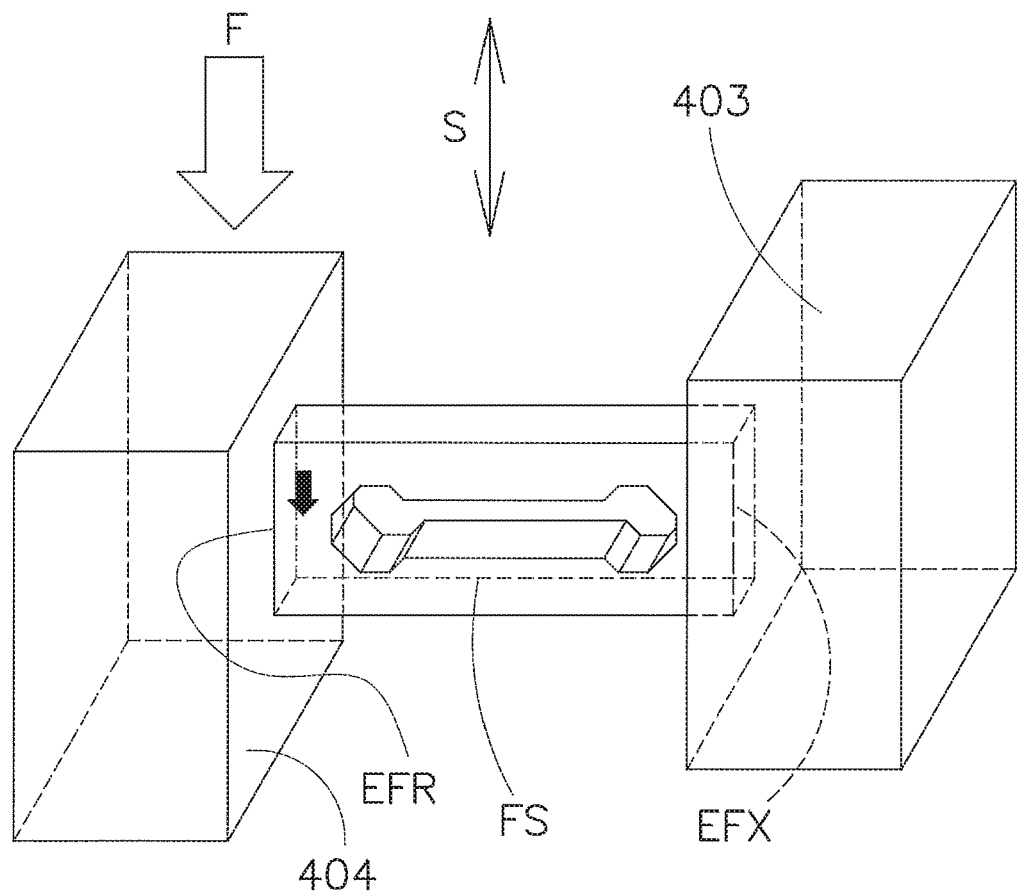
FIG. 13 is an enlarged view showing a force sensor installed in the mass measurement device according to the first modification 2A of the second embodiment of the present invention.

FIG. 13 is an enlarged view of the force sensor FS and the surrounding structure in the first modification 2A of the second embodiment. The movable extending part 404 moves in the x-axis direction relative to the base-extending part 403. At this time, the force sensor FS receives strain in the sensitivity direction S, which coincides with the x-axis direction, in accordance with vertical-direction force F, and outputs a sensing signal corresponding to the magnitude of this strain.

Returning to FIG. 12, the acceleration sensor AS also detects acceleration in the x-axis direction, which is the vertical direction.

Two hoses 46 travel through the horizontal yz plane, which is orthogonal to the sensitivity direction S, so as to not affect the force sensor FS or the acceleration sensor AS.

With this configuration, because the sensitivity direction S is the vertical direction, the sensing signal outputted by the force sensor FS can be used to measure the mass of the articles while the head 41 has stopped. Furthermore, both the sensing signal outputted by the force sensor FS and the acceleration sensor outputted by the acceleration sensor AS can be used to measure the mass of the articles while the head 41 is moving in the x direction.

(6-2) Second Modification 2B

Figure 14:
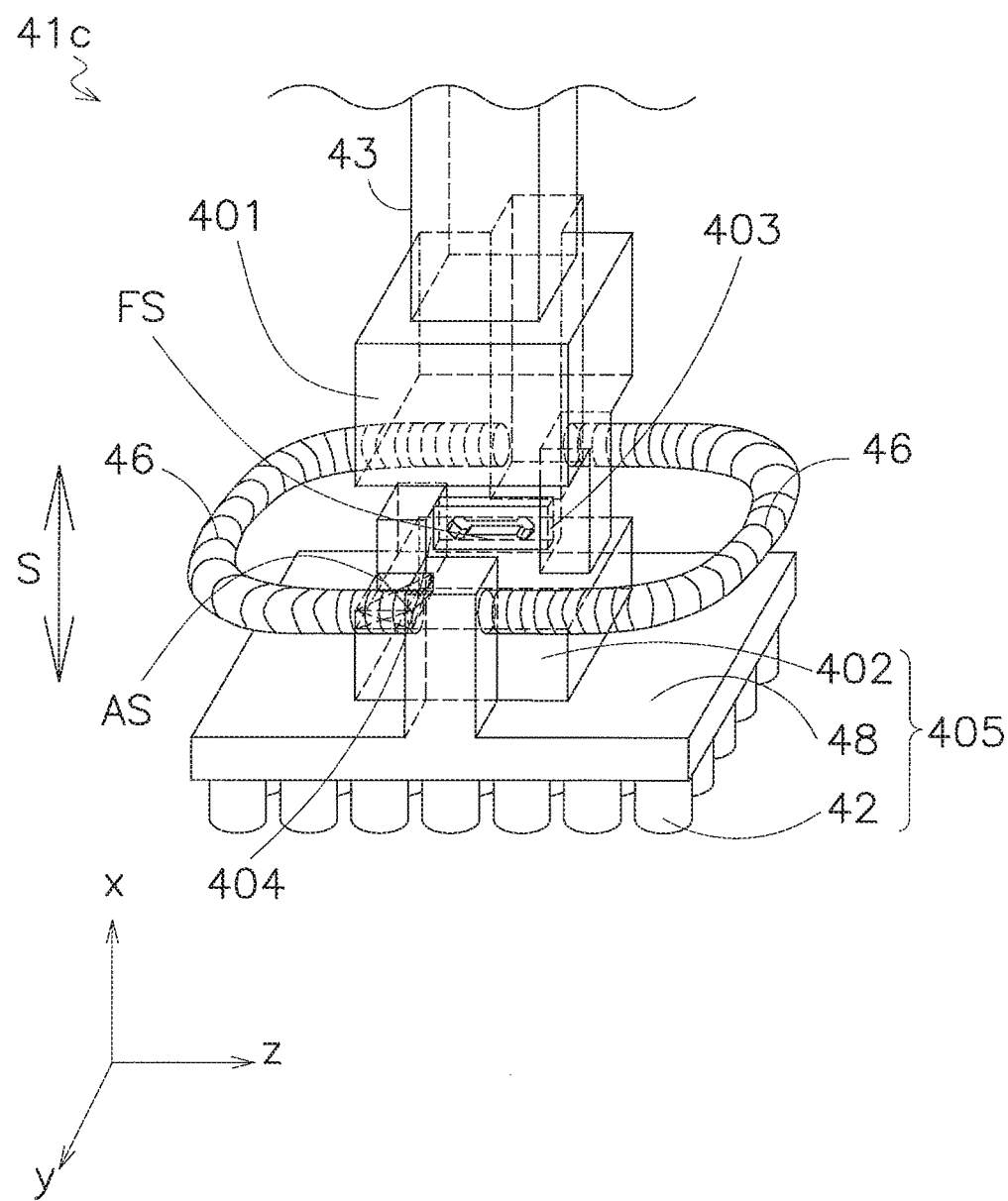
FIG. 14 is a perspective view showing a mass measurement device according to a second modification 2B of the second embodiment of the present invention.

FIG. 14 shows a head 41*c* of a mass measurement device according to a second modification 2B of the second embodiment of the present invention. In FIG. 14, the x-axis, y-axis, and z-axis directions differ from those in FIG. 11, and it should be noted that the x-axis direction is the vertical direction. With the head 41*c* of the mass measurement device according to the second modification 2B of the second embodiment of the present invention, the relative arrangement of the hoses 46 in relation to the force sensor FS differs from that of the head 41*b* according to the first modification 2A of the second embodiment of the present invention. But, the operating principle is the same as that of the head 41*b*.

Third Embodiment

FIG. 15 shows a head 41*d* of a mass measurement device according to a third embodiment of the present invention. In this drawing, the x-axis, y-axis, and z-axis directions are the same as those in FIG. 11, and it should be noted that the z-axis direction is the vertical direction. In the head 41*d* of the third embodiment, in place of a pair of hoses 46 of the head 41*a* (FIG. 11) according to the second embodiment, two sets each of which includes a base-part-side rigid pipe 461, a hose 462, and a movable-part-side rigid pipe 463 are employed. The head 41*d* according to the third embodiment is otherwise the same as the head 41*a* according to the second embodiment.

The base-part-side rigid pipes 461 and the movable-part-side rigid pipes 463 are composed of a metal or another rigid material, and thus do not pulsate during suction action. The hose 462 links the base-part-side rigid pipe 461 and the movable-part-side rigid pipe 463.

The sensitivity direction S of the sensor is the horizontal x-axis direction. Due to the presence of the flexible hoses 462, the movable part 402 can move relatively in the x-axis direction in relation to the base part 401. Therefore, the action of the force sensor FS is not disturbed.

Because the sets of the base-part-side rigid pipes 461, the hoses 462, and the movable-part-side rigid pipes 463 are disposed in the yz plane, which is orthogonal to the sensitivity direction S, the force sensor FS and the acceleration sensor AS are unlikely to be affected.

Fourth Embodiment

Figure 16:
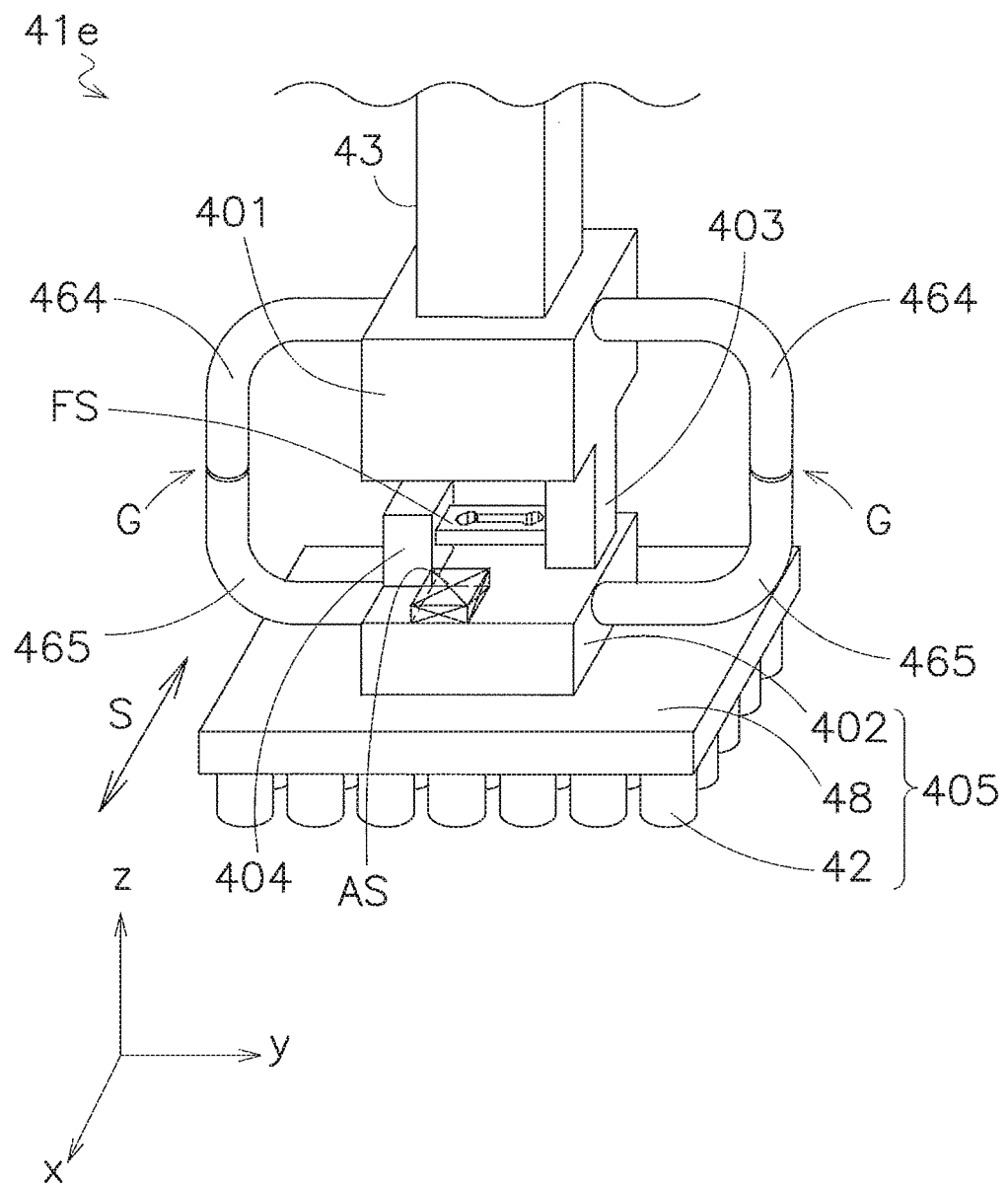
FIG. 16 is a perspective view showing a mass measurement device according to a fourth embodiment of the present invention.

FIG. 16 shows a head 41*e* of a mass measurement device according to a fourth embodiment of the present invention. In this drawing, the x-axis, y-axis, and z-axis directions are the same as those in FIG. 11, and it should be noted that the z-axis direction is the vertical direction. In the head 41*e* of the fourth embodiment, in place of the pair of hoses 46 of the head 41*a* (FIG. 11) according to the second embodiment, two sets each of which includes a base-part-side rigid pipe 464 and a movable-part-side rigid pipe 465 are employed. The head 41*e* according to the fourth embodiment is otherwise the same as the head 41*a* according to the second embodiment.

Between the base-part-side rigid pipe 461 and the movable-part-side rigid pipe 465 there is provided a gap G with an extent enough to deteriorate the suction performance.

The sensitivity direction S of the sensor is the horizontal x-axis direction. Due to the presence of the gaps the movable part 402 can move relatively in the x-axis direction in relation to the base part 401. Therefore, the action of the force sensor FS is not disturbed.

Because the sets of the base-part-side rigid pipes 464 and the movable-part-side rigid pipes 465 are disposed in the yz plane, which is orthogonal to the sensitivity direction S, the force sensor FS and the acceleration sensor AS are unlikely to be affected.

Fifth Embodiment

Figure 17:
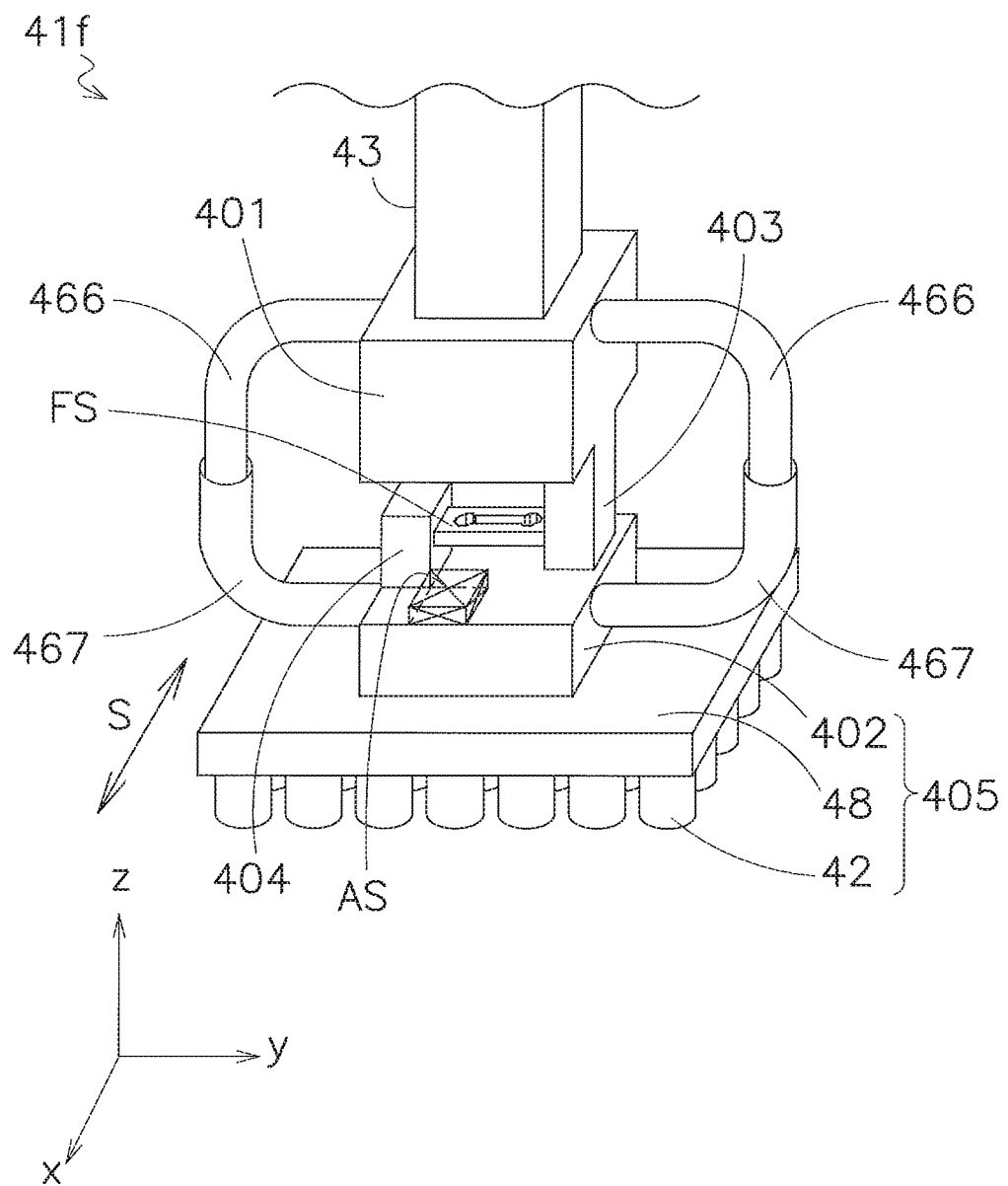
FIG. 17 is a perspective view showing a mass measurement device according to a fifth embodiment of the present invention.

FIG. 17 shows a head 41*f* according to a fifth embodiment of the present invention. In this drawing, the x-axis, y-axis, and z-axis directions are the same as those in FIG. 11, and it should be noted that the z-axis direction is the vertical direction. In the head 41*f* of the fifth embodiment, in place of the pair of hoses 46 of the head 41*a* (FIG. 11) according to the second embodiment, two sets each of which includes a base-part-side rigid pipe 466 and a movable-part-side rigid pipe 467 are employed. The head 41*f* according to the fifth embodiment is otherwise the same as the head 41*a* according to the second embodiment.

The base-part-side rigid pipes 466 are inserted into the movable-part-side rigid pipes 467 so as to not deteriorate suction performance.

The sensitivity direction S of the sensor is the horizontal x-axis direction. Because the inside diameter of the movable-part-side rigid pipes 467 is greater than the outside diameter of the base-part-side rigid pipes 466, the movable part 402 can move relatively in the x-axis direction in relation to the base part 401. Therefore, the action of the force sensor FS is not disturbed.

Because the sets of the base-part-side rigid pipes 466 and the movable-part-side rigid pipes 467 are disposed in the yz plane, which is orthogonal to the sensitivity direction S, the force sensor FS and the acceleration sensor AS are unlikely to be affected.

Other Alterations

The force sensor FS of the mass measurement device according to the present invention is not limited to a strain gauge-type load cell, and may be constituted of other elements and/or devices that can detect force. For example, the force sensor FS may be an electrostatic capacitance-type load cell, a magnetostrictive load cell, or a force balance-type scale.

The location where the mass measurement device according to the present invention is installed is not limited to the boxing robot 4, and may be the parallel link robot 3.

Alternatively, mass measurement devices according to the present invention may be installed in both the parallel link robot 3 and the boxing robot 4. In this case, more accurate measurements could be taken by double-checking the mass of the articles. Furthermore, it is also possible to determine abnormalities in the actions of the mass measurement devices.

The invention claimed is:

1. A mass measurement device comprising:
a force sensor, which has a fixed end and a free end, and outputs a sensing signal in accordance with a magnitude of a force in a sensitivity direction;
a suction channel configured to pass suctioned air through the suction channel;
a base part to which the fixed end is fixed;
an article-holding part fixed to the free end, one end of the suction channel being connected to the article-holding part, and the article-holding part being configured to hold an article due to the suctioned air; and
a computation unit configured to compute a mass of the article based on the sensing signal;
wherein the force sensor and the suction channel are disposed so that an x-axis directional component of a force exerted on the article-holding part by the suction channel is the smallest among the x-axis directional component, a y-axis directional component, and a z-axis directional component, where the sensitivity direction is an x-axis direction, a direction orthogonal to the x-axis direction is a y-axis direction, and a direction orthogonal to both the x-axis direction and the y-axis direction is a z-axis direction.

2. The mass measurement device according to claim 1, wherein
the suction channel is disposed so as to pass through the base part.

3. The mass measurement device according to claim 1, wherein
the suction channel has a hose disposed in a yz plane, which expands in the y-axis direction and the z-axis direction.

4. The mass measurement device according to claim 1, wherein
the suction channel has a rigid pipe disposed in a yz plane, which expands in the y-axis direction and the z-axis direction.

5. The mass measurement device according to claim 1, wherein
the suction channel has a pair of rigid pipes separated by a gap.

6. The mass measurement device according to claim 1, wherein
the suction channel has a pair of rigid pipes having different diameters, one pipe being inserted into the other pipe.

7. The mass measurement device according to claim 1, wherein
the force exerted on the article-holding part by the suction channel is generated by pulsation of the suction channel during air suction, or by movement of the suction channel caused by a start or an end of air suction.

8. The mass measurement device according to claim 1, further comprising:
a robot that causes the base part to move.

9. The mass measurement device according to claim 1, further comprising:
an acceleration sensor that outputs an acceleration signal in accordance with a magnitude of an acceleration of the article-holding part in the sensitivity direction;
the computation unit configured to compute the mass of the article based on:
the sensing signal outputted by the force sensor when the base part moves in the sensitivity direction; and
the acceleration signal outputted by the acceleration sensor when the base part moves in the sensitivity direction.

10. The mass measurement device according to claim 1, wherein
the sensitivity direction is a horizontal direction.

11. The mass measurement device according to claim 1, wherein
the sensitivity direction is a vertical direction.

12. The mass measurement device according to claim 1, wherein
the force sensor is a strain gauge-type load cell.

13. The mass measurement device according to claim 1, further comprising:
a vacuum pump in communication with the suction channel.

14. The mass measurement device according to claim 1, wherein the suction channel has a hose that travels in the z-axis direction and attaches to the article-holding part in the y-axis direction.

* * * * *